Aug. 2, 1960
G. A. CAIN
2,947,689
SALINE WATER HEATING PROCESSES AND SYSTEMS
Filed Dec. 3, 1953
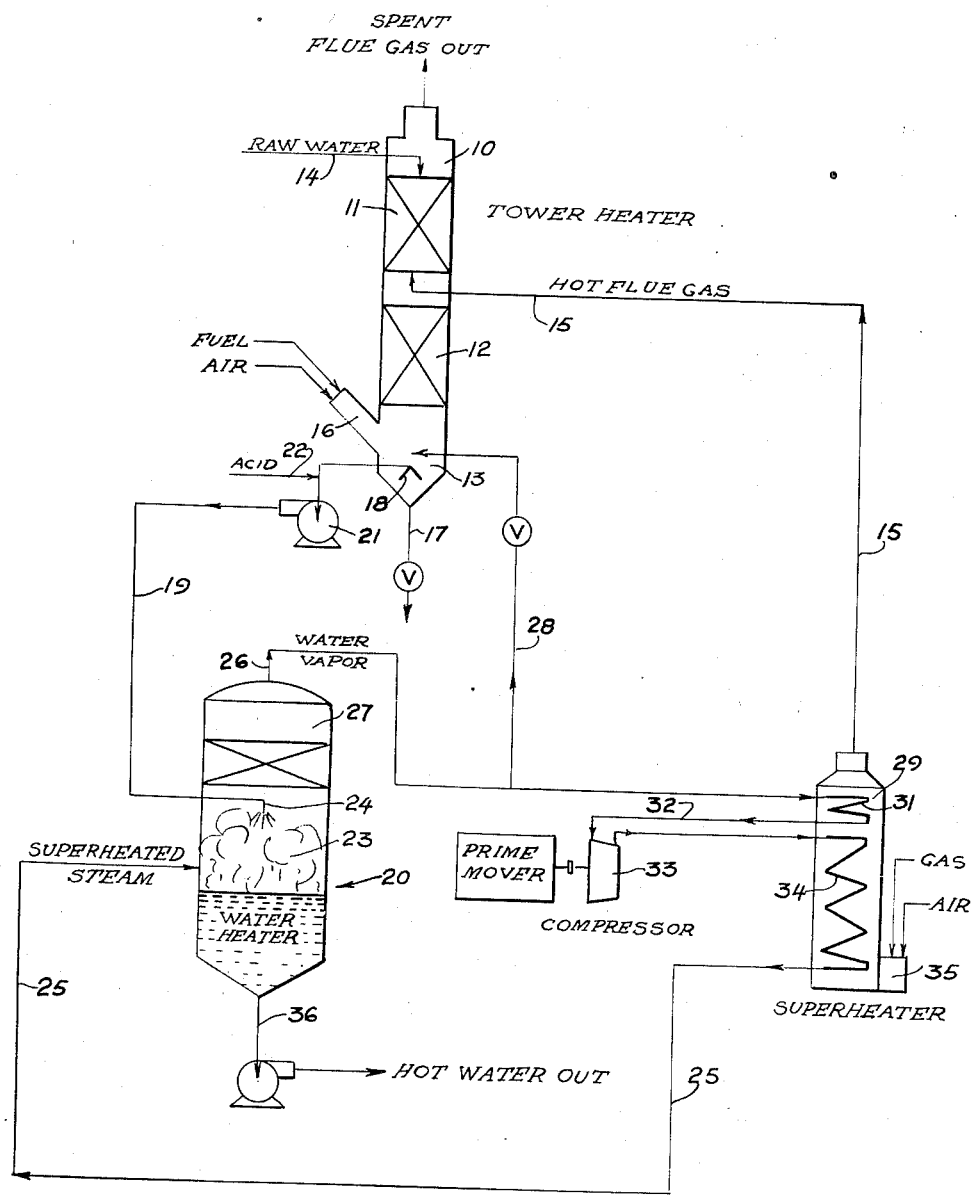
INVENTOR
Gordon A. Cain
BY
Pollard, Johnston Smythe Robertson
ATTORNEY

United States Patent Office 2,947,689
Patented Aug. 2, 1960

2,947,689

SALINE WATER HEATING PROCESSES AND SYSTEMS

Gordon A. Cain, New York, N.Y., assignor to Freeport Sulphur Company, New York, N.Y., a corporation of Delaware Filed Dec. 3, 1953, Ser. No. 395,869

15 Claims. (Cl. 210—56)

This invention relates to processes and heating systems for providing large quantities of process water at high temperatures using as the source of the raw water, particularly natural waters having scale-forming properties.

In the mining of sulfur from sulfur deposits located under salt marshes in coastal areas and under the sea, the large quantities of hot water required for the Frasch process are not available from the usual sources of relatively pure or fresh water, as that obtainable from wells, rivers or lakes. For economically successful operation in such areas, it is required that brackish water or sea water be used, but since these waters are scale-forming and corrosive when heated, the heating of the water cannot be effected by the use of ordinary boilers or of any type of heat exchanger where the heat is transferred through metal to the water, for scale deposits rapidly from such water even when it is only moderately heated.

The primary object of the present invention is to provide processes and an apparatus for heating large quantities of hot water to temperatures above 220° F. with substantial avoidance of scaling upon hot metal surfaces of the heating system used. Another object is to provide procedures for heating natural saline water or brines which are scale-forming or corrosive to temperatures and in quantities required for sulfur mining.

Other objects include the production of large amounts of hot process water without the use of large quantities of chemicals and without the use of expensive and sometimes inefficient corrosion-resistant alloys for the heating of such water. Another object is to heat scale-forming, natural water and brines in a manner which throws down scale-forming constituents in the body of the water being heated and does not deposit a prohibitive amount of scale upon any of the metal surfaces with which the water comes in contact.

Still another object is to improve the efficiency of water heating operations with respect to fuel utilization by avoiding scale deposition on any heating surfaces. A final object is to reduce the cost of operation and maintenance of hot water heating systems by avoiding scale and corrosion upon heat transfer surfaces.

Broadly considered the invention may be said to involve processes and heating systems for providing large quantities of hot process water at temperatures above 220° F. in a continuous stream in which the water to be heated is flowed under pressure into a heating vessel wherein it is directly contacted with superheated steam under pressure whereby the water is heated to a temperature above 220° F. and superheated steam is desuperheated forming water vapor or saturated steam in said vessel, and from which the said water vapor is withdrawn, converted into superheated steam and reintroduced into the heating vessel thereby to accomplish the heating of the water to the specified high temperature.

Before the water is introduced into said heating vessel in contact with the superheated steam it is desirable that the same be preliminarily heated to a temperature as high as about 195° F., but more suitably to from 140° to 190° F. by direct contact with hot gases or vapors, preferably combustion gases. The combustion gases may be derived from any suitable source but in a contemplated efficient embodiment of the invention, the heating gases used include the hot flue gases derived from the superheater later employed in the process.

In a more limited embodiment of the invention, the partially heated water after being subjected to the action of the hot flue gases is heated further by hot burner gases at a higher temperature, which gases may be obtained, for example, by the combustion of natural gas or oil.

The preliminary heating up to the temperature of 195° F. is preferably carried out in a tower heater wherein the raw water to be heated is introduced at the top and the heating gases are introduced at one or more lower levels, the said heating operation being carried out without the application of pressure.

For accomplishing the main or final heating of the process water, a heating vessel must be employed of a type which will cause or permit intimate contact of the water to be heated with superheated steam introduced into the vessel. It also must either be of a construction or be equipped with a spray eliminator or other device for collecting and discharging water vapor. A suitable heating vessel is one in which the hot water is sprayed into the side thereof at an intermediate level into contact with the superheated steam introduced into said vessel at a somewhat lower level and from which vessel water vapor is withdrawn from the top or at a level above a spray eliminator.

Since the heating of the water to the high temperatures reached in the heating vessel yields appreciable quantities of inert gas, it is desirable that the same be vented from the system along with any excess amount of water vapor before the vapor is converted into superheated steam. The heat of these withdrawn gases may be recovered by directly contacting the same in a preheater with the water subsequently introduced into the hereinbefore mentioned heating vessel.

For most efficient operation, the water vapor after it is separated from the inert gases is raised in temperature several degrees and converted into slightly superheated steam, then compressed and finally superheated to a very high temperature before being returned to the water heating vessel.

In the production of hot water for sulfur mining, the water is raised to a temperature in the range of 275° to 340° F. The process and heating system of the invention, however, may be used to provide process water at other temperatures under pressure, as where water is to be utilized in potash or soda ash mining.

A heating system exemplifying the present invention is illustrated in the accompanying diagrammatic drawing. With reference to the drawing there is illustrated a heating tower 10 composed of three parts—namely, a flue gas heat reclaimer section 11 near the top thereof, a burner gas heating section 12 at an intermediate point thereof and a purifying section 13 at the bottom thereof. A conduit 14 is connected substantially at the top thereof for introducing the raw water to be heated. A conduit 15 for the introduction of hot flue gases is connected to the tower at an intermediate point below the reclaimer section and a burner 16 for fuel and air is connected at a lower intermediate point below the higher temperature heating section.

The bottom of the tower constitutes a settling basin from which precipitated matter and other sediment may be withdrawn from time to time through a valved outlet 17. Somewhat above the bottom of the tower, there is a cone 18 connected to an outlet conduit 19 leading to and connected into the water heating vessel 20 at an intermediate level thereof. This conduit is provided with a pump 21 for producing the pressure required to introduce the water into the heater 20. The conduit 19 is also connected to an inlet conduit 22 for the introducing of acid where chemical treatment of the water is desired or required. This use of acid is described in detail in the copending application of Bernard A. Axelrad, et al., Serial No. 253,306, filed October 26, 1951, now Patent No. 2,756,035. The conduit 19 terminates within the center section 23 of the vertical heater 20 in a spray-producing means 24. An inlet conduit 25 for the introduction of superheated steam terminates in this center section in such relationship as to cause intimate contact of the steam with the sprayed water.

An outlet conduit 26 for the removal of water vapor or saturated steam is connected to the top of the vapor chamber 27 of a packed section of the said heating vessel. A branch conduit 28 from this conduit 26 leads to the tower 10 at a lower level therein, said branch conduit being provided with a suitable valve or a trap (not shown). The conduit 26 is connected to the coil 31 in the superheater 29, said coil being of a relatively short length, and in which the temperature of the water vapor is raised slightly to prevent condensation during subsequent compression. The said coil is connected to a conduit 32 which in turn leads to a compressor 33. This compressor is connected to the main coil 34 in the superheater 29. The discharge end of such coil is connected by the conduit 25 leading to and connected into the vapor chamber 23 of the water heating vessel 20 as hereinbefore described.

The heat for the superheater 29 may be provided by combustion of gas with air at the bottom thereof at 35. A conduit 15 connects to the tower heater 10 for conveying waste flue gases after the combustion gases have given up most of their heat to the water in the coils contained therein. The water heating vessel 20 contains an outlet conduit 36 at the bottom thereof for pumping and conveying the hot process water to the place of consumption, as to sulfur mines.

*Example*

Raw brackish water at a temperature of 70° F. is introduced into the top of the heating tower at the rate of 600 gallons per minute. In flowing through the flue gas heat reclaimer its temperature is raised to 130°–140° F. by contact with waste flue gases. The water flowing through the lower heating section of the tower is then heated to 190° F.–195° F. by contact with burner gases resulting from the combustion of natural gas.

The water heated in this manner collects in the bottom of the tower where separation of impurities takes place by sedimentation, the partially purified water flowing from the cone in the tower through the pump and thence to the water heating vessel wherein it is sprayed into contact with superheated steam and heated to about 330° F. In raising the temperature of the water in the heating vessel the steam becomes desuperheated and water vapor is formed. From the vapor chamber the water vapor or saturated steam is flowed to the superheater where its temperature is slightly raised from 330° F. to about 333° F. To prevent an inert gas buildup in the system, about five percent of the water input into the chamber is diverted from the water vapor line leading to the superheater, the said vapors containing the excess gases being reintroduced into the tower heater at the point above the water outlet thereof where latent heat of the water vapor and its sensible heat are given up to the water flowing downwardly therethrough and from which the fixed gases are vented.

The slightly superheated steam is then compressed and reintroduced through the main coil of the superheater and here the temperature of the steam is raised to 750° F. This steam is then introduced into the water heating vessel in contact with the water being sprayed thereinto.

The hot process water is flowed from the heating vessel at a temperature of 330° F. to its place of consumption.

The compressor 33 may be driven by any suitable prime mover as by a diesel engine, gas engine, gas turbine, electric motor or the like.

Fuel and power requirements and quantities of steam necessary for any particular operation can be calculated by known principles. They will vary of course with the feed water temperature, the final water temperature, the amount of superheat added to the steam, the amount of preliminary heat used, such as exhaust heat from other available sources, and the like. The temperatures mentioned in the foregoing example may be varied considerably to accomplish optimum or desired results under any special set of conditions encountered.

Automatic controls may be inserted at suitable places and in this manner the system can be made to balance itself without difficulty. For example, the temperature of the water leaving the water heating vessel can be automatically controlled by interlock with the amount of fuel burned in the bottom heating section of the heating tower. Also or alternatively, automatic controls can be provided such that a change in the temperature of the water leaving the water heater will change the amount of fuel introduced into and consumed in the superheater.

It should be understood that the present invention is not limited to the exact details herein disclosed but that it extends to all equivalent materials and procedures which will occur to those skilled in the art upon consideration of the scope of the claims appended hereto.

I claim:

1. A process for providing large quantities of hot process water from water having scale-forming salts therein at temperatures above 220° F. in a continuous operation which comprises, flowing under pressure the water to be heated when at a temperature below about 195° F. into a heating vessel, raising the temperature of the water to a level above 220° F. by means of substantially only the sensible heat of superheated steam directly contacted with said water in said vessel under pressure, thereby also providing water vapor in said vessel, withdrawing the water vapor thus produced from said vessel, heating said water vapor to provide superheated steam, introducing said superheated steam into said heating vessel thereby to accomplish the hereinbefore specified heating step and flowing the hot process water from said heating vessel containing the scale-forming salts therein.

2. A process for providing large quantities of hot process water at temperatures above 220° F. in a continuous operation wherein scaling of metal surfaces by salts in the water treated is substantially avoided which comprises, preliminarily heating said water part way to such minimum temperature level but not above about 195° F. by direct contact with combustion gases, flowing the resulting hot water under pressure into a heating vessel and into direct contact with superheated steam in said vessel thereby heating said water substantially only by the heat supplied by desuperheating said steam to a temperature above 220° F., withdrawing the resulting substantially desuperheated steam from said vessel, heating the same to provide superheated steam and introducing said superheated steam into said vessel thereby to accomplish the hereinbefore mentioned heating step, and flowing the hot process water therein formed from said heating vessel to a point of utilization.

3. A method for heating water having scale-forming salts therein to temperatures above 220° F. in a continuous operation which comprises flowing the water to be heated through a heating zone in direct contact with combustion gases without the application of pressure whereby the water is preliminarily heated, flowing the resulting hot water under pressure through a heating vessel, directly contacting said water in said vessel under pressure with superheated steam in a quantity which heats said water to a temperature above 220° F. by means of substantially only the sensible heat of the superheated steam and provides water vapor in a separate portion of said vessel, withdrawing the water vapor from said vessel, flowing said water vapor under pressure through a superheater, introducing the resulting superheated steam into said heating vessel thereby heating the water therein to the ultimately desired temperature and flowing the hot water thus obtained from said heating vessel.

4. A process for providing large quantities of hot process water at temperatures above 220° F. from scale-forming saline water which comprises continuously flowing said water through a preliminary heater first in contact with waste flue gases and then in contact with burner gases at a higher temperature without the application of pressure, continuously flowing the partially heated water thus obtained into a heating vessel under pressure, heating said water to a temperature above 220° F. by directly contacting said water in said vessel under pressure with superheated steam and transferring heat to said water substantially only by desuperheating said steam, continuously withdrawing the resulting substantially desuperheated steam from said vessel, converting said withdrawn steam to superheated steam in a gas fired superheater, continuously flowing said superheated steam to and into said vessel to accomplish the specified heating result, continuously flowing the waste flue gases from said superheater to said preliminary heater and continuously flowing the hot process water obtained from said heating vessel to a point of consumption.

5. A process for providing large quantities of hot saline water at temperatures above 220° F. in a continuous stream which comprises preliminarily heating said water substantially under atmospheric pressure, adding acid to said water in a quantity which reduces scale-forming tendencies, flowing the resulting hot treated water under pressure into a heating vessel, heating said water in said vessel to a temperature above 220° F. by directly contacting the same with superheated steam and transferring heat to said water substantially only by desuperheating said steam, withdrawing the resulting substantially desuperheated steam from said vessel, heating said withdrawn steam to provide superheated steam, introducing said superheated steam into said vessel thereby to accomplish the specified water heating step and flowing the hot saline water from said heating vessel to a point of consumption.

6. A process for heating brackish water in large quantities to temperatures above 220° F. in a continuous operation which comprises, flowing under pressure the water to be heated when at a temperature below about 195° F. into a heating vessel, directly contacting said water with superheated steam introduced into said vessel under pressure, in which operation the heat is supplied substantially only by desuperheating said steam, thereby providing desuperheated steam in said vessel, withdrawing said desuperheated steam from said vessel, heating said withdrawn desuperheated steam to provide superheated steam by flowing the same under pressure through a superheater in indirect heat exchange with hot combustion gases, flowing said superheated steam back to and into said vessel thereby to accomplish the hereinbefore specified heating step and flowing the hot water obtained from said heating vessel.

7. A process for providing large quantities of hot process water at temperatures above 220° F. in a continuous operation which comprises, flowing under pressure hot scale-forming saline water when at a temperature below about 195° F. into a heating vessel maintained under pressure, heating said water to a temperature above 220° F. by directly contacting said water in said vessel with superheated steam and transferring heat to said water substantially only by desuperheating said steam, thereby also producing water vapor in said vessel, withdrawing the water vapor thus formed from said vessel, venting inert gases from said vapor, compressing said water vapor, flowing the resulting water vapor under pressure through a superheater in indirect heat exchange with combustion gases whereby highly superheated steam is produced, introducing said superheated steam into said vessel to accomplish the hereinbefore specified heating step, and flowing the hot saline water from said heating vessel.

8. A process for heating large quantities of hot water to temperatures above 220° F. in a continuous operation with substantial avoidance of scaling of hot metal surfaces which comprises, flowing under pressure the scale-forming water to be heated when at a temperature below about 195° F. into a heating vessel, heating the said water in said vessel to a temperature above 220° F. by directly contacting the water with superheated steam under pressure and transferring heat to said water substantially only by desuperheating said steam, thereby producing water vapor in said vessel, withdrawing the water vapor thus formed from said vessel, venting inert gases from said vapor, heating said water vapor to an extent providing slightly superheated steam, compressing the resulting slightly superheated steam, flowing the same under the pressure through a superheater in indirect heat exchange with hot combustion gases whereby highly superheated steam is produced, flowing said superheated steam back into said heating vessel thereby accomplishing the hereinbefore specified heating step and flowing the hot water thus obtained from said heating vessel.

9. A process for providing large quantities of hot process water at temperatures above 220° F. from brackish water which comprises, in a continuous operation flowing the brackish water after the same has been heated part way to said indicated minimum temperature level but not above about 195° F. by direct contact with heating gases into a heating vessel under pressure, heating said water to a temperature above 220° F. in said vessel under pressure by substantially only the superheat transferred by directly contacting said water in the form of spray with superheated steam, in which vessel water vapor is also produced, withdrawing the water vapor thus formed from said vessel, heating said water vapor to a temperature which converts the same into highly superheated steam, returning said superheated steam to said vessel thereby to provide the heat utilized in said vessel, and flowing the hot process water from said heating vessel.

10. A process for heating large quantities of brackish water to temperatures above 220° F. in a continuous operation without substantial formation of scale on hot surfaces in the heating system employed which comprises, preliminarily heating said water partly to said minimum temperature level but not above about 195° F. by direct contact first with hot flue gases and then with fresh burner gases, flowing the resulting hot water under pressure into a heating vessel, directly contacting said water in said vessel with superheated steam which heats said water to the desired temperature level above 220° F. substantially only by the transfer of the sensible heat of the superheated steam whereby desuperheated steam is provided in an upper section of said vessel, withdrawing said desuperheated steam from said vessel, compressing and heating said desuperheated steam to provide superheated steam by flowing the compressed desuperheated steam through a superheater in indirect heat exchange with hot combustion gases and introducing said superheated steam into said vessel to effect the said water heating and flowing the hot process water from said heating vessel.

11. A process for providing large quantities of hot process water at temperatures above 220° F. in a continuous operation which comprises, introducing under pressure water containing scale-forming salts when at a temperature below about 195° F. in the form of a spray into a top portion of a heating vessel into direct contact with superheated steam, heating said water to a temperature above 220° F. by means of substantially only the sensible heat of said steam whereby substantially desuperheated steam is provided in another portion of said vessel, withdrawing the desuperheated steam thus produced from said vessel, heating said desuperheated steam to provide superheated steam, introducing the superheated steam obtained into said heating vessel thereby to accomplish the hereinbefore specified heating step and flowing the hot process water still containing said salts from said heating vessel.

12. A process for providing large quantities of hot process water at temperatures above 212° F. in a continuous operation which comprises flowing under pressure water containing scale-forming salts when at a temperature below about 195° F. into an intermediate level of a direct contact, high pressure water-heating vessel, directly contacting said water in said vessel under pressure with superheated steam also introduced at an intermediate level, heating said water to a temperature above 220° F. by means of substantially only the sensible heat of said steam whereby substantially desuperheated steam is provided, withdrawing the desuperheated steam thus produced from the top of said vessel, heating said desuperheated steam to provide superheated steam, introducing the superheated steam obtained into said heating vessel thereby to accomplish the hereinbefore specified heating step and flowing the hot process water from the bottom of said heating vessel.

13. A process for heating large quantities of scale-forming saline water to temperatures above 220° F. in a continuous operation with substantial avoidance of scaling of hot metal surfaces which comprises introducing the saline water to be heated when at a temperature below about 195° F., in the form of a spray, into a center section of a direct contact, high pressure water-heating vessel under pressure, directly contacting said sprayed water with superheated steam being introduced into said section, heating said water to a temperature above 220° F. by means of substantially only the sensible heat of said steam whereby substantially desuperheated steam is provided in a vapor chamber at the top of said vessel, withdrawing the desuperheated steam thus produced from said vessel, heating said desuperheated steam to provide superheated steam, introducing the superheated steam obtained into said heating vessel thereby to accomplish the hereinbefore specified water heating step and flowing the hot process water from the bottom of said heating vessel.

14. A heating system for providing large quantities of hot process water at temperatures above 220° F. which comprises a pressure heating vessel for the water, a conduit connected to said vessel for introducing water thereinto, a pump in said conduit, a second conduit connected to said vessel for introducing superheated steam into said vessel into direct contact with water therein, a superheater for converting water vapor into superheated steam, a third conduit connecting said vessel with said superheater for conducting water vapor from said vessel to said superheater, a compressor connected into said third conduit, a fourth conduit connecting said superheater with said heating vessel for conducting the superheated steam from said superheater to said vessel and a fifth conduit connected to said vessel for conducting the hot water produced in said vessel to a place of consumption.

15. A heating system for providing large quantities of hot process water at temperatures above 220° F. which comprises a vertical, high pressure, water-heating vessel for the water, a conduit connected at an intermediate level of said vessel for introducing water thereinto in the form of a spray, a pump in said conduit, a second conduit connected at an intermediate level of said vessel for introducing superheated steam into said vessel into direct contact with the sprayed water therein, a superheater for converting water vapor into superheated steam, a third conduit connecting the top of said vessel with said superheater for conducting water vapor from said vessel to said superheater, a compressor connected into said third conduit, a fourth conduit connecting said superheater with said heating vessel for conducting the superheated steam from said superheater to said vessel and a fifth conduit connected to the bottom of said vessel for conducting the hot water produced in said vessel to a place of consumption.

References Cited in the file of this patent

UNITED STATES PATENTS

| | | |
|---|---|---|
| 869,875 | Berry | Nov. 5, 1907 |
| 977,578 | Wilkinson | Dec. 6, 1910 |
| 1,099,433 | Erith | June 9, 1914 |
| 1,219,320 | Jacobus | Mar. 13, 1917 |
| 1,405,783 | Holle | Feb. 7, 1922 |
| 1,927,649 | Noack | Sept. 19, 1933 |
| 1,941,686 | Huet | Jan. 2, 1934 |
| 1,972,356 | Pfleiderer | Sept. 4, 1934 |
| 2,066,348 | Hays | Jan. 5, 1937 |
| 2,124,254 | Ledinegg | July 19, 1938 |
| 2,193,795 | Bredtschneider | Mar. 19, 1940 |
| 2,647,370 | Miller | Aug. 4, 1953 |
| 2,756,207 | Axelrad et al. | July 24, 1956 |
| 2,756,208 | Axelrad et al. | July 24, 1956 |

OTHER REFERENCES

Nordell: "Water Treatment," New York: Reinhold, 1951, p. 227, Ser. No. 434,619 (A.P.C.), published June 8, 1943.